US011393359B2

(12) United States Patent
Blackwell, Jr.

(10) Patent No.: US 11,393,359 B2
(45) Date of Patent: Jul. 19, 2022

(54) SYSTEM TO TEACH MATHEMATICS USING VIRTUAL MUSICAL INSTRUMENTS AND ASSOCIATED METHODS

(71) Applicant: MAKE MUSIC COUNT LLC, Atlanta, GA (US)

(72) Inventor: Marcus Blackwell, Jr., Atlanta, GA (US)

(73) Assignee: MAKE MUSIC COUNT LLC, Atlanta, GA (US)

( * ) Notice: Subject to any disclaimer, the term of this patent is extended or adjusted under 35 U.S.C. 154(b) by 322 days.

(21) Appl. No.: 16/850,510

(22) Filed: Apr. 16, 2020

(65) Prior Publication Data

US 2021/0327298 A1 Oct. 21, 2021

(51) Int. Cl.
*G09B 19/02* (2006.01)
*G10H 1/34* (2006.01)
*G09B 15/00* (2006.01)
*A63F 13/814* (2014.01)
*G10H 1/00* (2006.01)

(52) U.S. Cl.
CPC ............ *G09B 19/02* (2013.01); *A63F 13/814* (2014.09); *G09B 15/003* (2013.01); *G10H 1/0016* (2013.01); *G10H 1/34* (2013.01); *A63F 2300/8047* (2013.01)

(58) Field of Classification Search
CPC ..... G09B 19/02; G09B 15/003; A63F 13/814; A63F 2300/8047; G10H 1/0016; G10H 1/34
See application file for complete search history.

(56) References Cited

U.S. PATENT DOCUMENTS

| 6,727,417 | B2 | 4/2004 | Oren-Chazon | |
|---|---|---|---|---|
| 7,799,984 | B2 | 9/2010 | Salter | |
| 7,893,337 | B2 | 2/2011 | Lenz | |
| 8,362,347 | B1 | 1/2013 | Scharfeld | |
| 8,378,195 | B2 * | 2/2013 | Willoughby | G09B 15/003 84/477 R |
| 9,020,476 | B2 | 4/2015 | Leipzig et al. | |
| 9,082,311 | B2 | 7/2015 | Franzblau | |
| 10,413,822 | B2 * | 9/2019 | Katagai | A63F 13/46 |
| 2019/0213905 | A1 * | 7/2019 | Ariel | G10H 1/0016 |
| 2021/0327298 | A1 * | 10/2021 | Blackwell, Jr. | G09B 19/02 |

\* cited by examiner

*Primary Examiner* — Robert W Horn

(74) *Attorney, Agent, or Firm* — Allen, Dyer et al.

(57) ABSTRACT

A system to teach mathematics using virtual musical instruments displayed on a client computing device includes a server, a database stored on the server, an application stored on the server, and a plurality of songs stored on the server. The system also includes a plurality of mathematical equations stored in the database, where each mathematical equation comprises a composite of musical notes and mathematical operators. The system includes a local application stored on the client computing device to display the virtual musical instrument and is configured to display a correct indicator in response to the user solving the mathematical equation correctly when the user plays a musical note on the virtual musical instrument corresponding to the numerical answer that correlates to the song.

20 Claims, 9 Drawing Sheets

SYSTEM TO TEACH MATHEMATICS USING VIRTUAL MUSICAL INSTRUMENTS AND ASSOCIATED METHODS

TECHNICAL FIELD

The present invention relates to the field of teaching, and, more particularly, to a system to teach mathematics using virtual musical instruments and associated methods.

BACKGROUND

Presently, there exist many systems for teaching a person how to play a musical instrument. These prior art systems may include a visual presentation to the musician on a computer screen or a modified electronic musical instrument. There are even video games built around the user playing a simulated musical instrument to provide instruction. This interaction between playing a video game and music is enjoyable to the user.

In contrast to playing video games and music, most children learning math do not view it as an enjoyable experience. It is difficult to keep their attention and most view math as a tedious and boring task to learn. There have been attempts to present math lessons to children using computers, however, the method of teaching using a computer is similar to that to a teacher using a chalkboard and thus has similar shortcomings.

Accordingly, there is a need for a system and method to make learning math more enjoyable for children as if they were playing music but while learning math.

SUMMARY

A system to teach mathematics using virtual musical instruments displayed on a client computing device is disclosed. The system includes a server, a database stored on the server, an application stored on the server, and a plurality of songs stored on the server. The system also includes a plurality of mathematical equations stored in the database, where each mathematical equation comprises a composite of musical notes and mathematical operators. In addition, the system includes a plurality of answers to the plurality of mathematical equations stored in the database, where the musical notes of a song correlate to answers to the mathematical equations in the database.

The system may also include a local application stored on the client computing device to display the virtual musical instrument. The plurality of mathematical equations may each include at least one operation involving fractions, decimals, multiplication, division, algebra, pre-calculus, and calculus. In addition, the local application may be configured to play the song on the virtual musical instrument automatically.

The system may also include a connection between the server and the client computing device, where the local application is configured to communicate with the application stored on the server via the connection to present a mathematical equation on the client computing device in response to a user selecting a song.

The local application may be configured to display a correct indicator in response to the user solving the mathematical equation correctly by playing a musical note on the virtual musical instrument corresponding to the numerical answer that correlates to the song. In a particular aspect, the client computing device comprises may comprise a smartphone, and the virtual musical instrument may comprise a representation of a piano keyboard. The local application may further be configured to present a subsequent mathematical equation where the answer correlates to the next sequential musical note of the song.

In another particular aspect, a method to teach mathematics using virtual musical instruments displayed on a client computing device is disclosed. The method includes generating an account for users to access an application on the client computing device, providing access to the application using the client computing device, verifying the account to permit access to the application, and receiving a selection for a song to use for the mathematics lesson. The method also includes displaying an equation comprising a composite of musical notes and mathematical operators, and receiving user input from a virtual musical instrument displayed on the client computing device and that corresponds to the numerical answer to the equation, where the user input comprises playing a musical note selected on the virtual musical instrument by the user.

In addition, the method includes displaying the next equation comprising a composite of musical notes and mathematical operators where the numerical answer is the next musical note of the song, and repeating displaying the next equation until at least a portion of the song is played on the virtual musical instrument. The virtual musical instrument may comprise a representation of a piano keyboard, the client computing device may comprise a smartphone, and the equation the user is solving may comprise at least one operation involving fractions, decimals, multiplication, division, algebra, pre-calculus, and calculus.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Mobile and game-based learning are novel approaches characterized by the use of mobile devices that enable learning anywhere and at any time. The present invention is directed to advancing mathematics in grade-school students by teaching mathematics through the use of music on mobile devices, such as smartphones and tablets. Students learn to solve mathematics equations by identifying correct answers that are musical notes from popular songs, for example. It is understood that students will recognize the songs because the selected songs will be age-appropriate for the students.

One aspect of the invention engages grade-school students with mathematics through the use of a software application available for download on mobile devices that uses virtual musical instruments, for example. In particular, mathematics (e.g., algebra and fractions) is used to correlate to a distance between musical notes, as well as musical scales. A benefit to learning musical scales through the present invention instead of reading off of a sheet of manuscript paper is that using the musical number line will help grade-school students commit the musical scales to memory.

Figure 1:
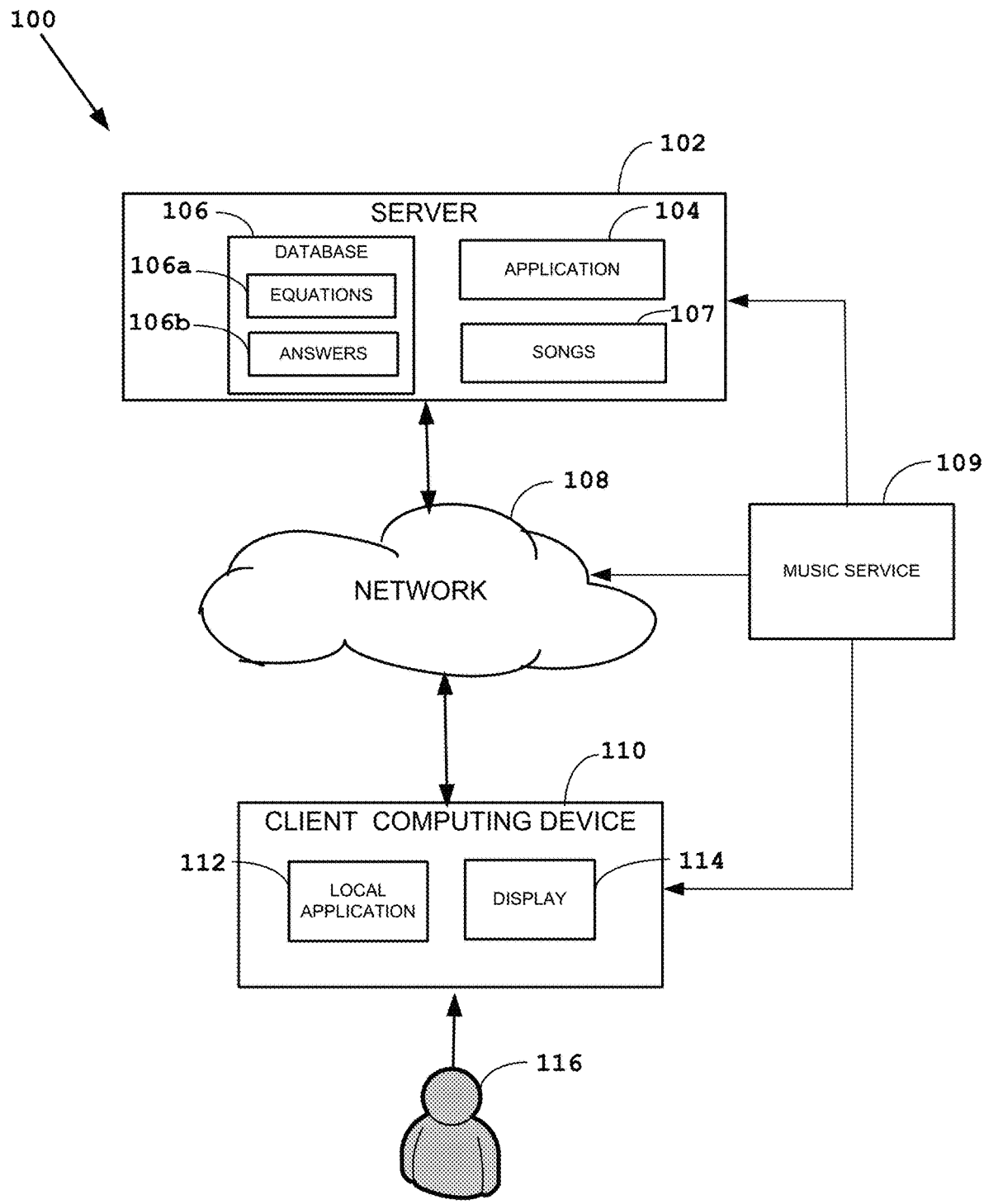
FIG. 1 is schematic block diagram illustrating an embodiment of a system to teach mathematics using musical instruments in accordance with features of the present invention.
Figure 2:
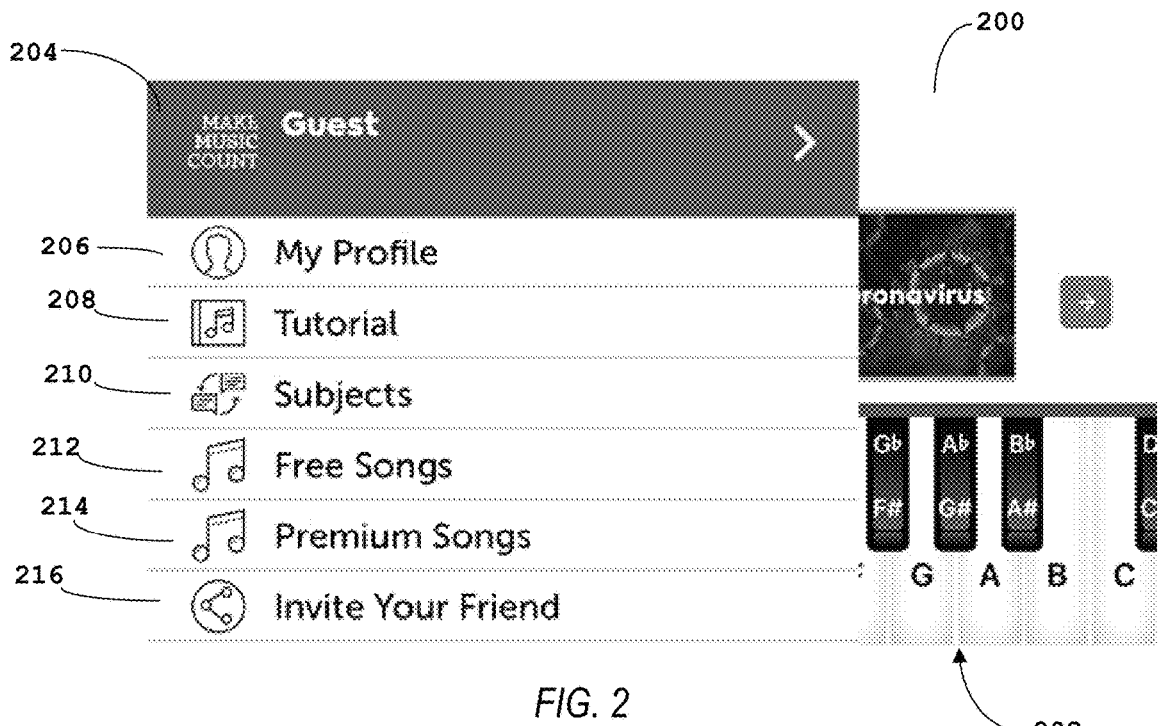
FIG. 2 is a graphical user interface ("GUI") of the system of FIG. 1.

A particular aspect of a system to teach mathematics using virtual musical instruments displayed on a client computing device is illustrated in FIG. 1 and generally designated 100. As described above, the system 100 is a teaching tool that can be implemented as an application on a smartphone, for example. The system 100 includes an application 104 and a database 104 stored on the server 102. In addition, a plurality of songs 107 are stored on the server 102 or may be provided by a music service 109.

A plurality of mathematical equations 106a and answers 106b to the equations 106a are stored in the database 106. Each mathematical equation 106a comprises a composite of musical notes and mathematical operators. The plurality of mathematical equations 106a may include fractions, decimals, multiplication, division, algebra, pre-calculus, or calculus, for example. The musical notes of a song 107 correlate to the answers 106b to the mathematical equations 106a stored in the database 106.

The server 102 is connected to a network 108 such as the Internet. In turn, a client computing device 110, such as smartphone device, for example, is connected to the network 108. The client computing device 110 includes a local application 112 stored on the client computing device 110 and a display 114. A user 116 can use the client computing device 110 to access the local application 112 using the display 114 or other user input/output device as will be appreciated to those of ordinary skill in the art. In another aspect, the mathematical equations 106a and answers 106b are stored on the client computing device 110. The songs 107 may also be stored on the client computing device 110 or accessible through a musical service 109.

A virtual instrument such as a piano keyboard, for example and as explained in more detail below, can be displayed on the display 114 (e.g. screen) of the client computing device 110. The local application 112 may be configured to play a song 107 on the virtual instrument automatically in order to show the user the proper keys to play the song 107.

In a particular aspect, the application 104 stored on the server 102 is configured to present a mathematical equation 106a on the client computing device 110 in response to a user selecting a song 107. As the user 116 solves the mathematical equation 106a, the user 116 plays a musical note on the virtual musical instrument corresponding to the numerical answer that correlates to the song 107a. If the user 116 plays the correct musical note indicating that the numerical answer that the user calculated was also correct, then an indicator is displayed to the user 116. The local application 112 then presents a subsequent mathematical equation 106a wherein the answer to the subsequent mathematical equation 106a correlates to the next sequential musical note of the song 107a.

Referring now to FIGS. 2-12, a graphical user interface ("GUI") 200 of the system 100 described above is illustrated. On a first screen shown in FIG. 2, the user 116 is presented with a menu 204 that includes several options. For example, the options may include "my profile" 206, tutorial" 208, "subjects" 210, "free songs" 212, "premium songs" 214, and "invite your friend" 216. A virtual musical instrument 202 is also displayed on the GUI 200 and in this example it is a piano keyboard.

Figure 3:
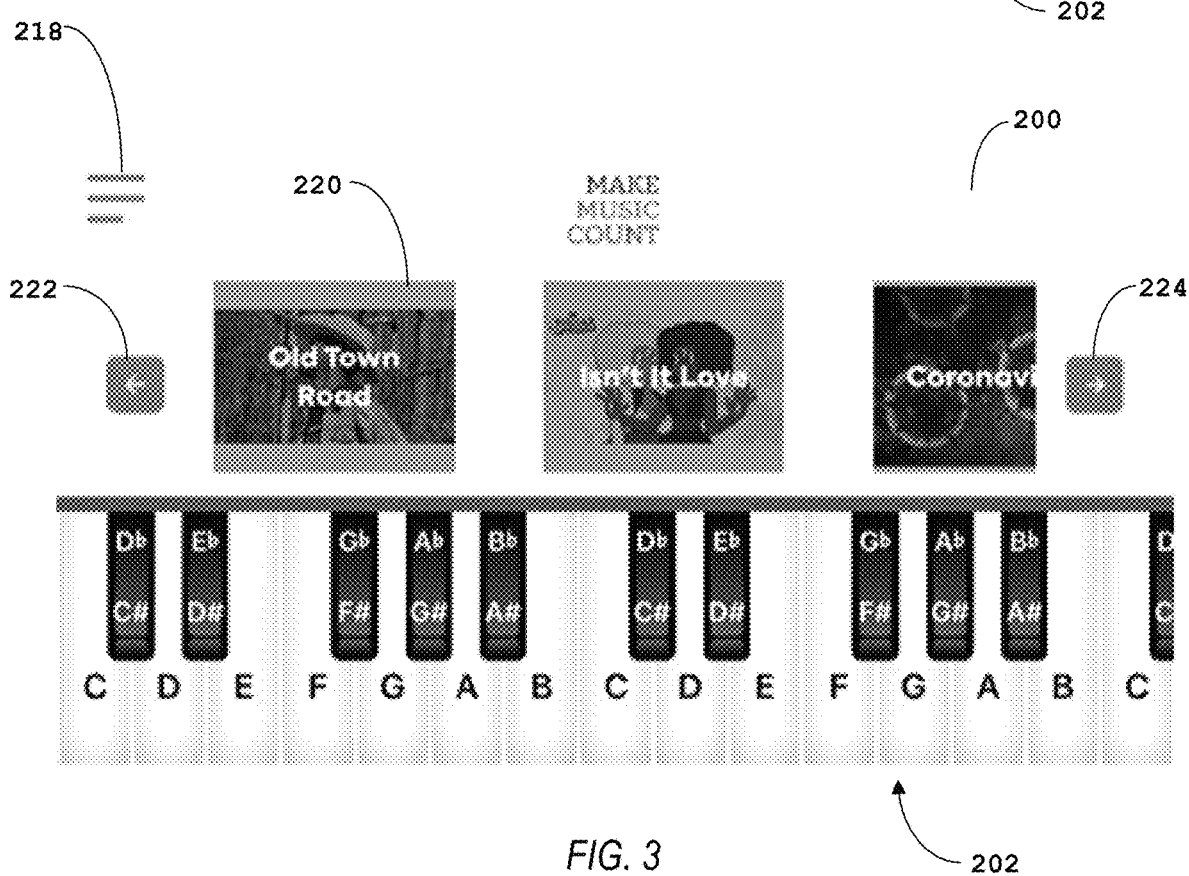
FIG. 3 is a virtual musical instrument displayed on the GUI.

Once the user 116 makes a selection from the menu 204, the user 116 in this example is presented with a selection of songs 220 to choose from as shown in FIG. 3. The user 116 can toggle back 222 and forward buttons 224 to move through the songs that are available to use with the teaching lesson.

Figure 4:
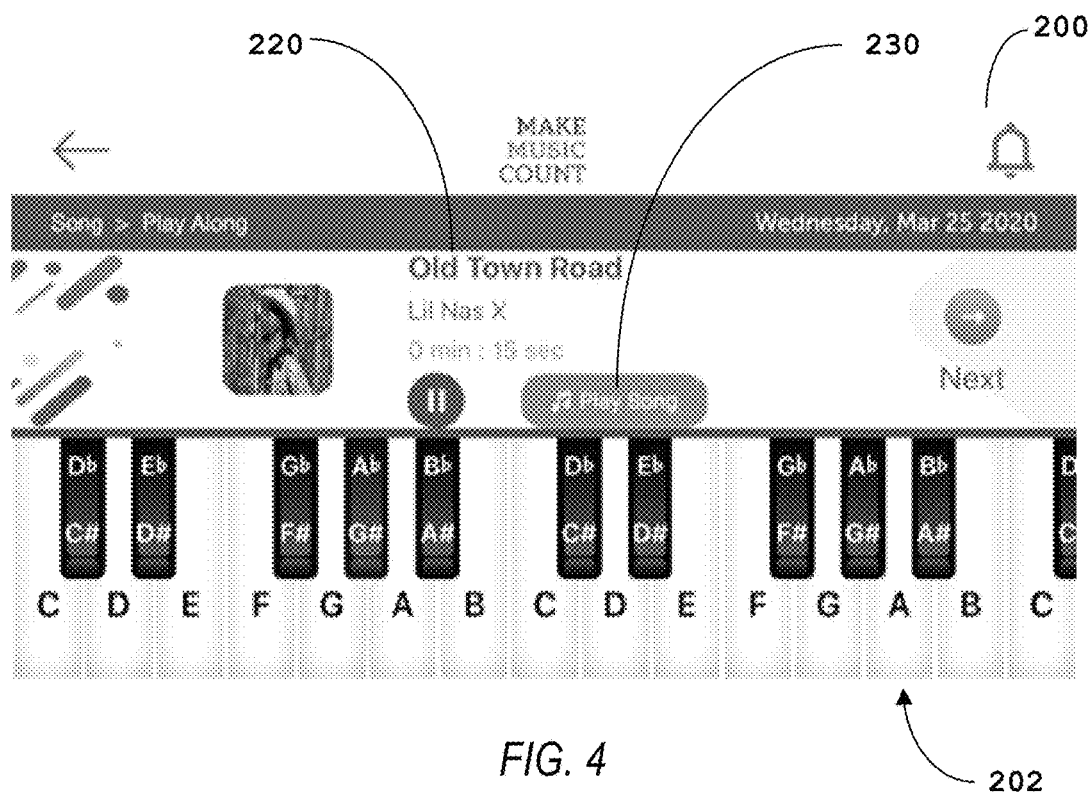
FIG. 4 is a name of a song displayed that was selected by a user using the GUI.

Referring now to FIG. 4, the user 116 may have the option to select "play song" 230, where the application automatically plays the song by illuminating the piano keys on the piano keyboard 202 as the song plays on the client computing device 110.

Figure 5:
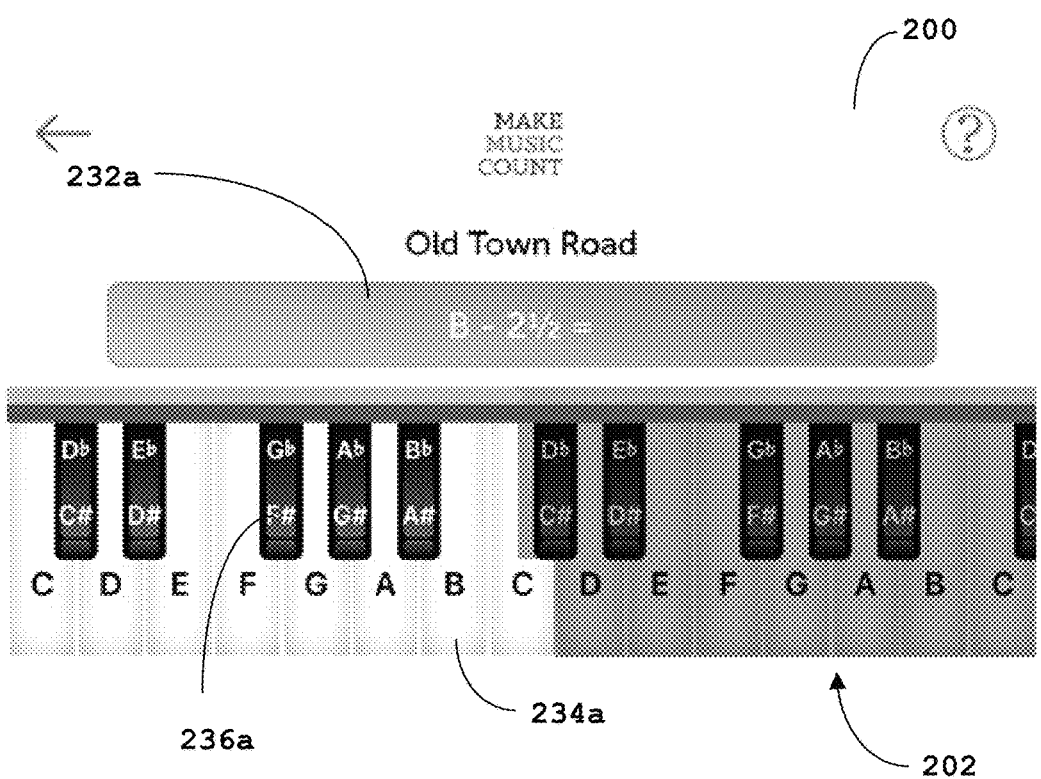
FIG. 5 is a first mathematical equation displayed in accordance with initiation of a teaching lesson using the selected song.

Referring now to FIG. 5, a mathematical equation 232a is presented to the user 116. The first portion of the equation 232a is the musical note "B". The user 116 locates the key 234a that corresponds to the musical note "B" on the piano keyboard 202. Once the key 234a is located the user solves the equation 232a. In this example, the user must subtract "2" from "B". Each key represents ½ so that to subtract 2½ the user 116 needs to move to the left along the keyboard 202 by five keys. Accordingly, the answer is the G♭ and F# key 236a. This is also the first note of the song.

Figure 6:
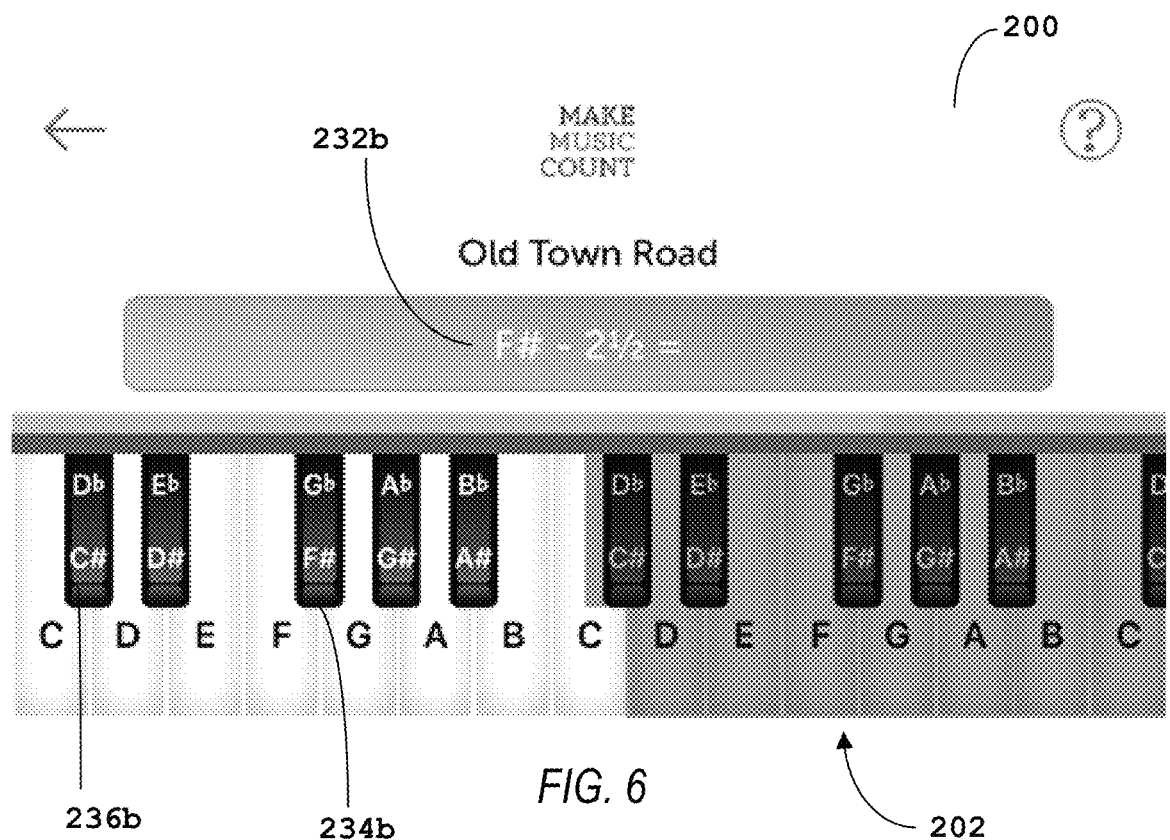
FIG. 6 is a second mathematical equation displayed using a second note of the selected song as a correct answer.
Figure 7:
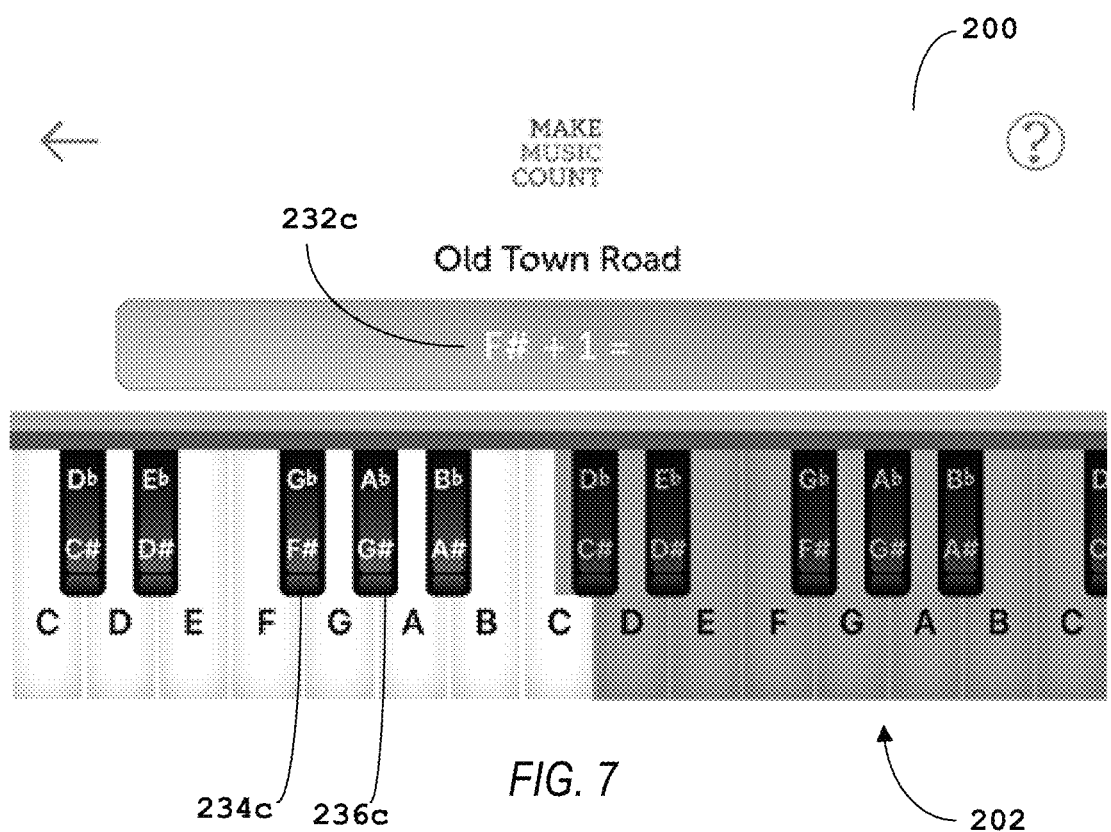
FIG. 7 is a third mathematical equation displayed using a third note of the selected song as a correct answer.

Moving on to FIG. 6, the second note of the song can be played by solving the equation 232b. In this example, the user must subtract 2½ from F#. The user 116 locates the key 234b that corresponds to the musical note "F#" on the piano keyboard 202. Once the key 234b is located the user 116 solves the equation 232b by subtracting 2½ or five keys. Accordingly, the user 116 moves to the left along the keyboard to C# and D♭ key 236b. The user 116 plays that key 236b and the next equation 232c is presented to the user 116 as shown in FIG. 7.

The third note of the song can be played by solving the equation 232c. In this example, the user 116 must add 1 to F#. The user 116 locates the key 234c that corresponds to the musical note "F#" on the piano keyboard 202. Once the key 234c is located the user 116 solves the equation 232c by adding 1, which equates to two keys. Accordingly, the user 116 moves to the right along the keyboard to G# and A♭ key 236c. The user plays that key 236c and the next equation 232d is presented to the user 116 as shown in FIG. 8.

Figure 8:
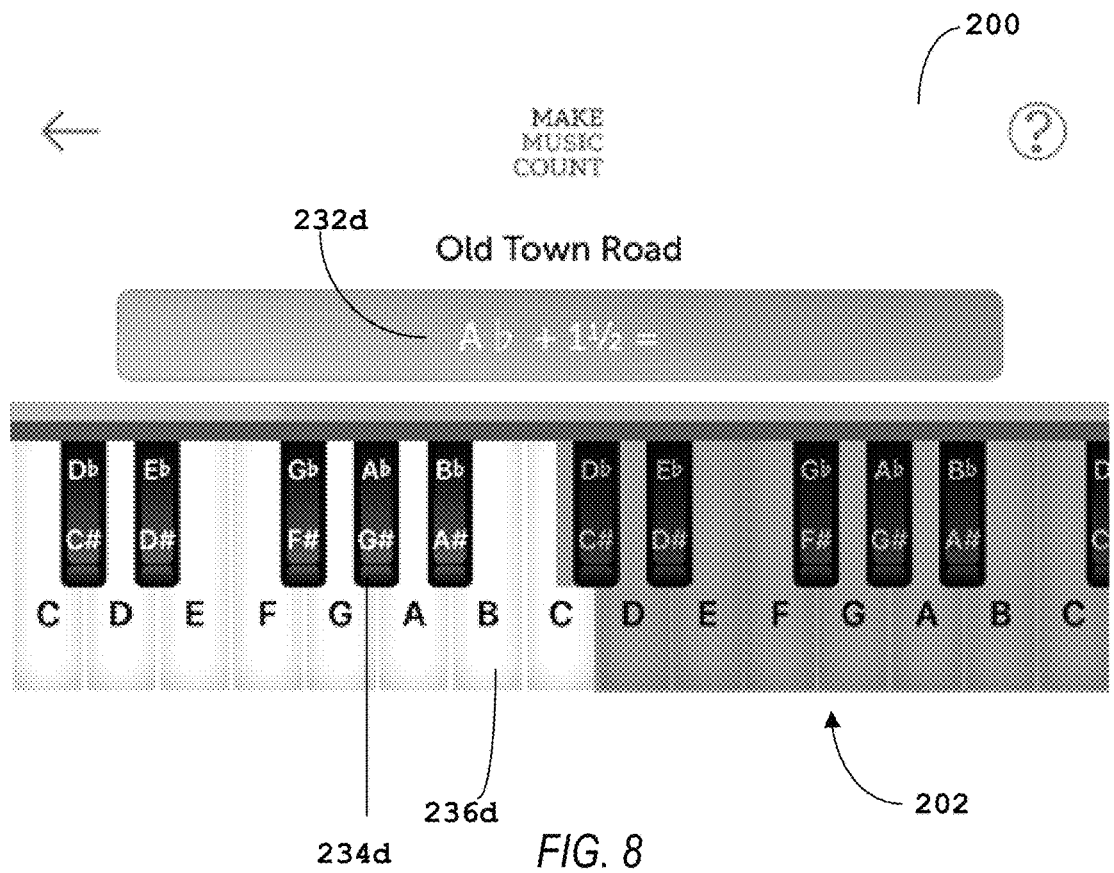
FIG. 8 is a fourth mathematical equation displayed using a fourth note of the selected song as the correct answer.
Figure 9:
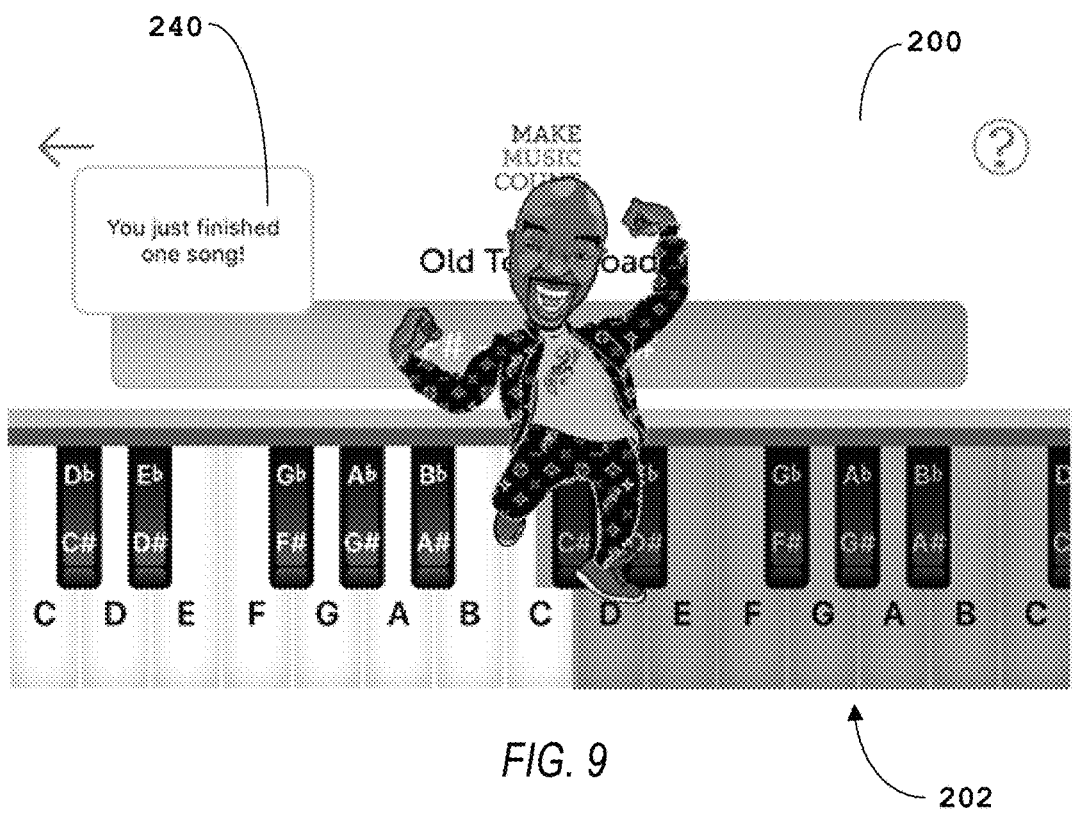
FIG. 9 is a visual indicator displayed on the GUI indicating that the user has answered the mathematical equations correctly.

Similar to the solving the equations as explained above, the fourth note of the song can be played by solving the equation 232d as shown in FIG. 8. In this example, the user 116 must add 1½ to A #. The user 116 locates the key 234d that corresponds to the musical note "A#" on the piano keyboard 202. Once the key 234d is located the user 116 solves the equation 232d by adding 1½, which equated to three keys. Accordingly, the user 116 moves to the right along the keyboard to the "B" key 236d. The user plays that key 236d and a correct indicator 240 is presented to the user 116 as shown in FIG. 9 as having played the correct musical notes to at least a portion of a song.

Figure 10:
FIG. 10 is positive reinforcement messaging to the user.
Figure 11:
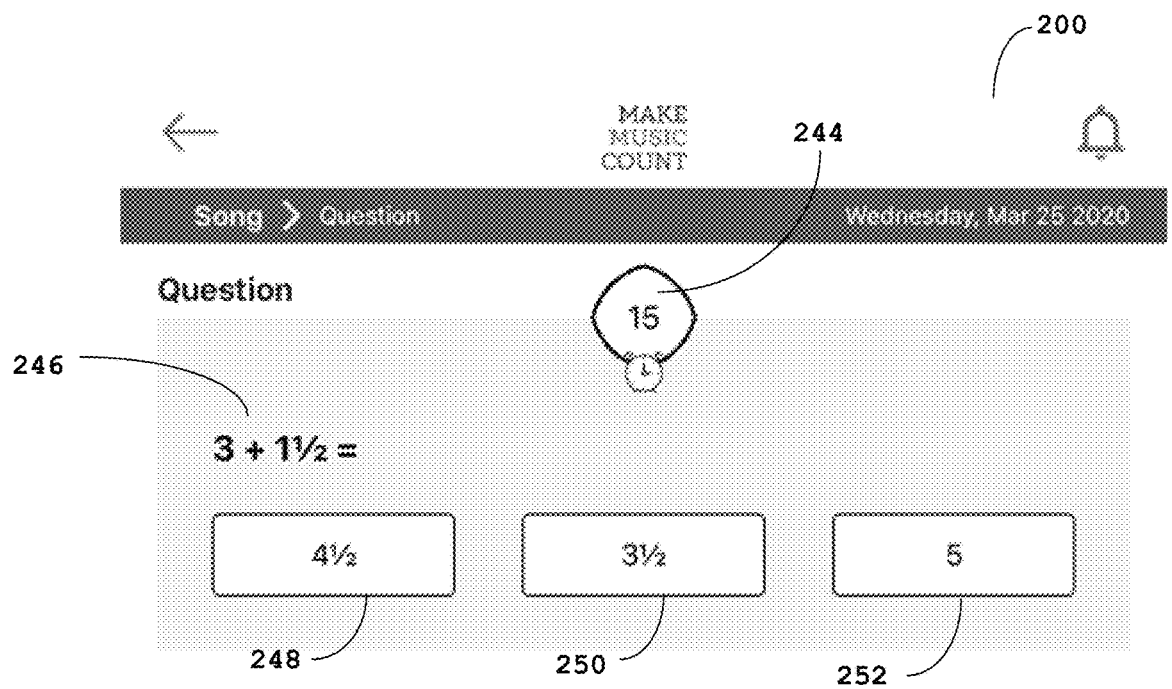
FIG. 11 is displaying another aspect of the system that may provide additional teaching exercise to earn additional points.
Figure 12:
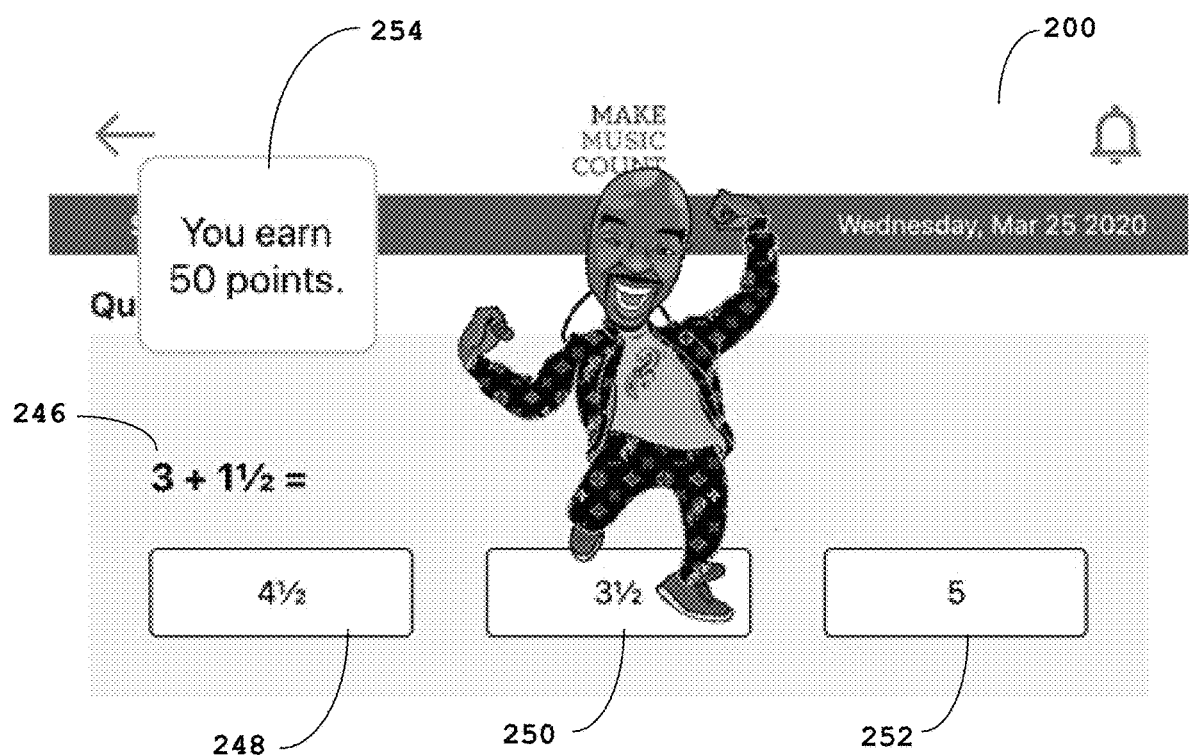
FIG. 12 is additional positive reinforcement messaging to the user.

In addition, other positive reinforcement can be provided to the user 116. For example, as shown in FIG. 10, a banner is displayed indicating that "50 Points" has been won by the user 116 by correctly solving the equations and playing the song on the virtual musical instrument.

In another aspect, the system can be used without selecting a song. Instead, to reinforce the math lesson that was completed using the virtual musical instrument explained above, the user is presented with a standard mathematical equation 246 to solve as shown in FIG. 10. In addition a timer 244 is used to limit the amount of time the user 116 has to solve the equation and select the correct answer. In this example, the user 116 must subtract 1½ from 3. There are three possible answers presented to the user 116. The first possible answer 248 is 4½, the second possible answer 250 is 3 and the third possible answer 252 is 5. If the user 116 chooses the correct answer of 4½ in this example, then a banner is displayed indicating that "50 Points" has been won by the user 116 by correctly solving the equation within the time limit.

Figure 13:
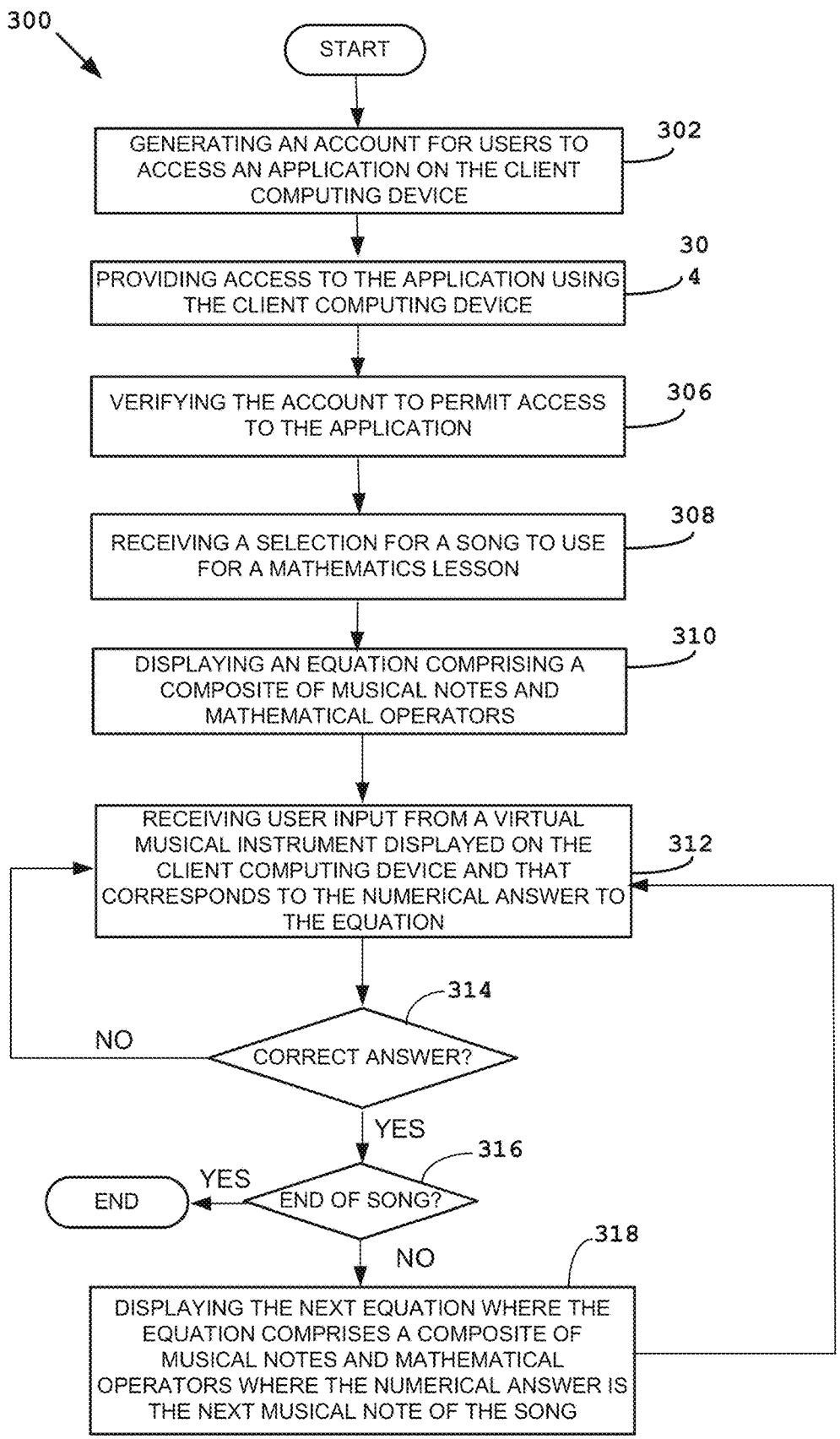
FIG. 13 is a flow diagram of a particular illustrative embodiment of a method to teach mathematics using musical instruments implementing the system of FIG. 1.

In another aspect, a flow diagram of a method 300 to teach mathematics using virtual musical instruments displayed on a client computing device is shown in FIG. 13. The method 300 includes generating an account for users to access an application on the client computing device, at 302, and providing access to the application using the client computing device, at 304. Moving to 306, the method includes verifying the account to permit access to the application, receiving a selection for a song to use for the mathematics lesson, at 308, and displaying an equation, at 310, comprising a composite of musical notes and mathematical operators.

In addition, the method includes, at 312, receiving user input from a virtual musical instrument displayed on the client computing device and that corresponds to the numerical answer to the equation. The user input includes the user playing a musical note on the virtual musical instrument. If the answer is not correct, at 314, the user tries again until the correct note is played. The method also includes displaying the next equation, at 318, where the equation comprises a composite of musical notes and mathematical operators where the numerical answer is the next musical note of the song. The method includes repeating displaying the next equation, at 316, until the end of the song or at least a portion of the song is played on the virtual musical instrument. The virtual musical instrument may comprise a representation of a piano keyboard or other instrument as can be appreciated by those of ordinary skill in the art.

The client computing device may a smartphone or tablet, for example. The equations that the user solves may include at least one operation involving fractions, decimals, multiplication, division, algebra, pre-calculus, and calculus.

Figure 14:
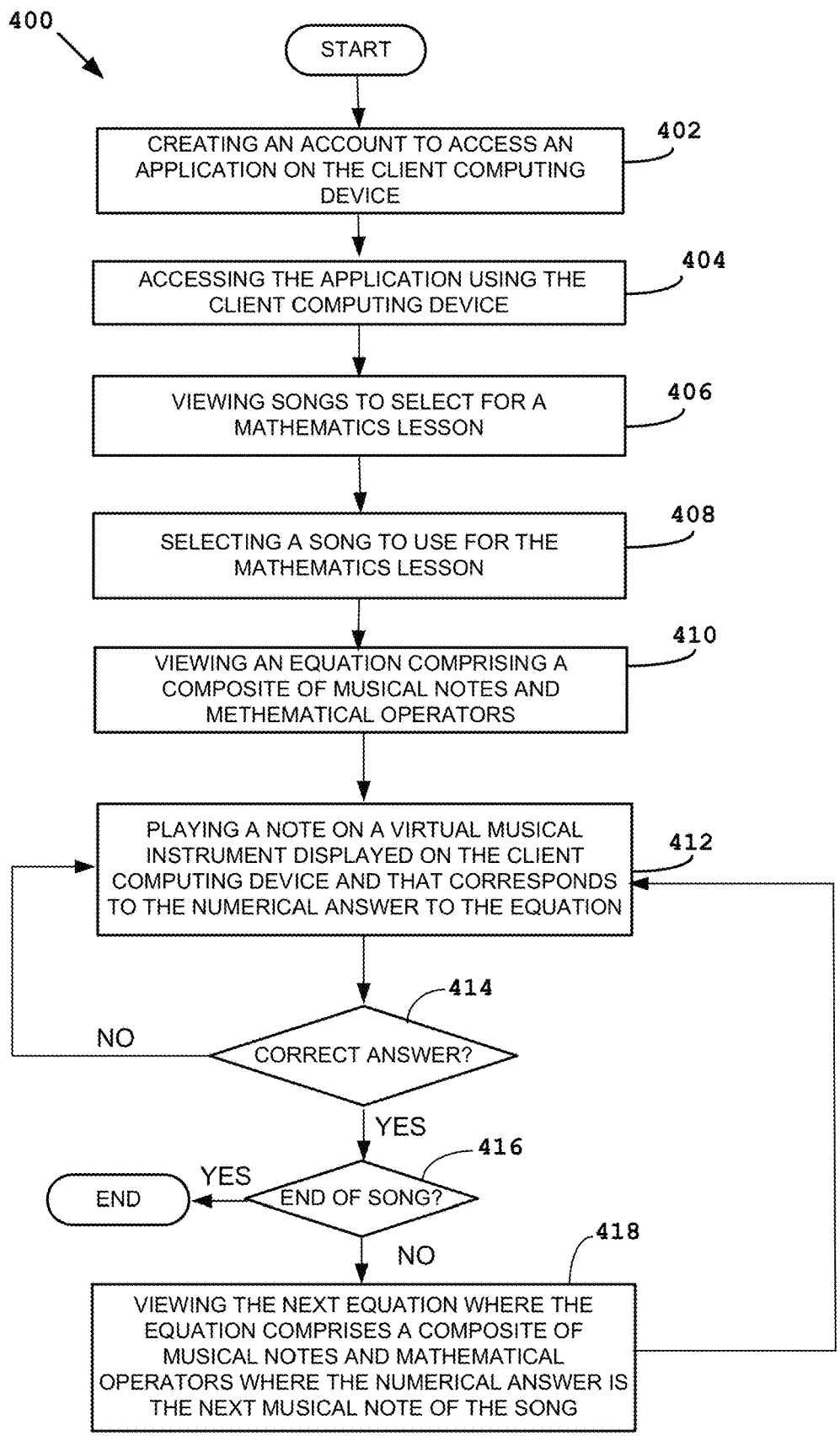
FIG. 14 is a flow diagram of a method of a user using the graphical user interface of the system of FIG. 1.

Referring now to FIG. 14, a flow diagram of a method 400 of a user using the graphical user interface of the system of FIG. 1 is illustrated. The method 400 includes creating an account to access an application on the client computing device, at 402, and accessing the application using the client computing device, at 404. The method includes viewing, at 406, songs to select for a mathematics lesson, and selecting a song to use for the mathematics lesson, at 408. Moving to 410, the method also includes viewing an equation comprising a composite of musical notes and mathematical operators.

In addition, the method includes, at 412, playing a note on a virtual musical instrument displayed on the client computing device and that corresponds to the numerical answer to the equation. If the answer is not correct, at 414, the user tries again until the correct note is played. The method also includes viewing the next equation, at 418, where the equation comprises a composite of musical notes and mathematical operators where the numerical answer is the next musical note of the song. The method includes repeating displaying the next equation, at 416, until the end of the song or at least a portion of the song is played on the virtual musical instrument.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system to teach mathematics using virtual musical instruments displayed on a client computing device comprising:
    a server;
    a database stored on the server;
    an application stored on the server;
    a plurality of songs stored on the server;
    a plurality of mathematical equations stored in the database, each mathematical equation comprising a composite of musical notes and mathematical operators; and
    a plurality of answers to the plurality of mathematical equations stored in the database, wherein the musical notes of a song correlate to answers to the mathematical equations in the database.

2. The system to teach mathematics using virtual musical instruments of claim 1, further comprising a local application stored on the client computing device to display the virtual musical instrument.

3. The system to teach mathematics using virtual musical instruments of claim 1, wherein the plurality of mathematical equation comprises at least one operation involving fractions, decimals, multiplication, division, algebra, pre-calculus, and calculus.

4. The system to teach mathematics using virtual musical instruments of claim 2, wherein the local application is configured to play the song on the virtual musical instrument automatically.

5. The system to teach mathematics using virtual musical instruments of claim 2, further comprising a connection between the server and the client computing device.

6. The system of claim 5, wherein the local application is configured to communicate with the application stored on the server via the connection to present a mathematical equation on the client computing device in response to a user selecting a song.

7. The system of claim 6, wherein the local application is configured to display a correct indicator in response to the user solving the mathematical equation when the user correctly plays a musical note on the virtual musical instrument corresponding to the numerical answer that correlates to the song.

8. The system to teach mathematics using virtual musical instruments of claim 7, wherein the client computing device comprises a smartphone.

9. The system to teach mathematics using virtual musical instruments of claim 7, wherein the virtual musical instrument comprises a representation of a piano keyboard.

10. The system to teach mathematics using virtual musical instruments of claim 7, the local application further configured to present a subsequent mathematical equation wherein the answer correlates to the next sequential musical note of the song.

11. A system to teach mathematics using virtual musical instruments displayed on a client computing device comprising:
- a database;
- an application;
- a plurality of mathematical equations stored in the database, each mathematical equation comprising a composite of musical notes and mathematical operators; and
- a plurality of answers to the plurality of mathematical equations stored in the database, wherein the musical notes of a song correlate to answers to the mathematical equations in the database;
- wherein the application is configured to present a mathematical equation on the client computing device in response to a user selecting a song, and to display a correct indicator in response to the user solving the mathematical equation correctly when the user plays a musical note on the virtual musical instrument corresponding to the numerical answer that correlates to the song.

12. The system to teach mathematics using virtual musical instruments of claim 11, further comprising establishing a connection to a plurality of songs.

13. The system to teach mathematics using virtual musical instruments of claim 12, wherein the application is a local application stored on the client computing device to display the virtual musical instrument.

14. The system to teach mathematics using virtual musical instruments of claim 12, further comprising a server, wherein the application is stored on the server.

15. The system to teach mathematics using virtual musical instruments of claim 14, further comprising a connection between the server and the client computing device.

16. The system to teach mathematics using virtual musical instruments of claim 12, the application further configured to present a subsequent mathematical equation wherein the answer correlates to the next sequential note of the song.

17. A method to teach mathematics using virtual musical instruments displayed on a client computing device comprising:
- generating an account for users to access an application on the client computing device;
- providing access to the application using the client computing device;
- verifying the account to permit access to the application;
- receiving a selection for a song to use for the mathematics lesson;
- displaying an equation comprising a composite of musical notes and mathematical operators;
- receiving user input from a virtual musical instrument displayed on the client computing device and that corresponds to the numerical answer to the equation, wherein the user input comprises playing a musical note selected on the virtual musical instrument by the user;
- displaying the next equation comprising a composite of musical notes and mathematical operators where the numerical answer is the next musical note of the song; and
- repeating displaying the next equation until at least a portion of the song is played on the virtual musical instrument.

18. The method to teach mathematics using virtual musical instruments of claim 17, wherein the virtual musical instrument comprises a representation of a piano keyboard.

19. The method to teach mathematics using virtual musical instruments of claim 17, wherein the client computing device comprises a smartphone.

20. The method to teach mathematics using virtual musical instruments of claim 17, wherein the equation comprises at least one operation involving fractions, decimals, multiplication, division, algebra, pre-calculus, and calculus.

* * * * *